(12) United States Patent
Mariniello

(10) Patent No.: US 8,103,265 B2
(45) Date of Patent: Jan. 24, 2012

(54) SYSTEM AND METHOD FOR ASSIGNING CALL PRIORITY

(75) Inventor: Francesco Mariniello, Castel San Giorgio (IT)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 341 days.

(21) Appl. No.: 11/996,340

(22) PCT Filed: Jul. 22, 2005

(86) PCT No.: PCT/EP2005/053585
§ 371 (c)(1), (2), (4) Date: Nov. 18, 2009

(87) PCT Pub. No.: WO2007/009497
PCT Pub. Date: Feb. 25, 2007

(65) Prior Publication Data
US 2010/0142452 A1 Jun. 10, 2010

(51) Int. Cl.
*H04L 12/28* (2006.01)

(52) U.S. Cl. .................................. 455/418; 370/437
(58) Field of Classification Search .......... 455/418–420, 455/435; 370/329, 412, 437, 462
See application file for complete search history.

(56) References Cited

U.S. PATENT DOCUMENTS

2002/0071444 A1 6/2002 Aschir
2004/0198357 A1 10/2004 Plyle et al.

*Primary Examiner* — Kent Chang
*Assistant Examiner* — Kashif Siddiqui

(57) ABSTRACT

A method for handling a call in an Intelligent telecommunications network, wherein the following steps are performed by a controller (3) providing logic for the Intelligent telecommunications network:—receiving (207, 304, 406) a first information element relating to a precedence indicator of a call prioritization service,—sending (208, 305, 407) a second information element derived from the first information element to a switch (5,8) for the handling of the call according to a priority indicated by the second information element. The method is particularly suitable for CAMEL networks in which the call prioritization service is eMLPP.

23 Claims, 4 Drawing Sheets

SYSTEM AND METHOD FOR ASSIGNING CALL PRIORITY

FIELD OF THE INVENTION

The present invention relates to method and nodes for handling calls in an Intelligent telecommunications network. More particularly, the invention relates to method and nodes for providing interaction between CAMEL and eMLPP services in an Intelligent mobile telecommunications network.

BACKGROUND OF THE INVENTION

Network operators have provided methods for enabling privileged people to access the mobile network services by overriding any existing call connection, for instance in cases in which the mobile network suffers from congestion due to a critical event.

In particular, service providers, based on the subscriber's need, set a maximum precedence level of the subscriber at the subscription time. When accessing the mobile network, the subscriber can select a precedence level up to and including the maximum precedence level he has subscribed to, on a per-call basis. According to the precedence level, the subscriber can benefit of a priority over other subscribers for accessing the same service or for an existing call directed to the same destination.

The enhanced Multi-Level Precedence and Pre-emption service (eMLPP) is currently used in mobile telecommunications networks for providing different levels of precedence for call set-up and for call continuity in case of handover. The technical specification of the eMLPP service is disclosed in 3GPP TS 23.067, v.6.1.0, which is hereby incorporated by reference.

A pre-emption service may regard a resource or a called party. In a resource pre-emption, a call of a low priority user can be terminated so that resources can be made available for a call of higher priority. A called-party pre-emption can be decided by the subscriber and can consist in terminating a call to a particular user when a higher priority call from the subscriber is directed towards that specific user.

There are seven eMLPP priority levels which, in descending order, read as A, B, 0, 1, 2, 3 and 4. A and B are internal values of the Mobile Switching Centre and are mapped to value 0 when sent over signalling protocols. Value 4 represents the lowest priority level.

The MSC/VLR node for mobile originating and mobile terminating calls allocates the priority that is provided to the radio access network and to the core network. If a priority has been allocated to the originating subscriber of the call, this priority is also applied for the connected terminating subscriber.

In mobile-originated calls, the priority level depends on the calling subscriber. If the user has no eMLPP subscription, the call shall have a default priority level defined in the network, if the network supports the service. Otherwise, if the user has an eMLPP subscription, the call shall have the priority level selected by the user at set up or the priority level predefined by the subscriber as a default priority level upon registration.

In mobile-terminated calls, the priority level depends on the calling party. If the call is not an ISDN MLPP call, i.e. no priority level is defined, the call shall be treated in the mobile network with a default priority level. If the call is an ISDN MLPP call, the call shall be treated with the priority level provided by the interfacing network.

As regards mobile-to-mobile calls in the same network or in case of roaming, the priority is treated for the calling subscriber as for mobile originated calls and for the called subscriber as for mobile terminated calls.

Information concerning the maximum priority level that a subscriber is entitled to use at call establishment is stored in the Home Location Register (HLR).

If the provisioning state for eMLPP is set to "Provisioned" then, when the subscriber registers with a Visitor Location Register (VLR), the Home Location Register (HLR) sends information about the logical state of eMLPP, the maximum priority level and the default priority level to the VLR, which stores such information.

The priority level, or level of precedence, and some other eMLPP parameters are carried in the signalling protocol, e.g. ISUP, for intra- and inter-network communications.

An intelligent network (IN) is a telecommunications network wherein intelligence is taken out of a switch and placed in a controller that then provides the logic for the IN and thus the intelligence. This separation provides the network operator with the means to develop and control services more efficiently and allow to introduce new capabilities more rapidly into the network. Once introduced, services can be easily customized to meet individual customer's needs.

Customised Application for Mobile Enhanced Logic (CAMEL) is an IN feature that provides mechanisms to support services of operators that are not covered by standardised services when roaming outside the Home Public Land Mobile Network (HPLMN). A Service Control Point (SCP) such as a GSM Service Control Function (gsmSCF) is the functional entity containing the CAMEL logic.

A drawback of current CAMEL networks is that the gsmSCF cannot interact with the eMLPP-defined level of precedence, regardless of whether the subscriber is roaming in a partner network or is using the network of his own operator.

Moreover, the priority assigned at dialogue level for the branch of the call toward and from the current gsmSCF is not derived from the eMLPP precedence level already established for that process.

In summary, there exist no methods or systems that allow to handle a call in an Intelligent telecommunication network according to a priority already set for this call or according to priority information available within the IN network or to handle communication between nodes in an intelligent network according to those aforementioned priority information.

SUMMARY OF THE INVENTION

The aim of the present invention is to provide a method and a node that overcome the above drawbacks.

It is an object to maintain any precedence information associated with a call in an Intelligent Network (IN) and to derive priority information from said precedence information for call handling according to the derived priority.

A further object of the invention is to allow an IN controller to modify existing priority information or to prioritise its internal processes, for instance to give priority to a specific IN request over other IN service requests.

The above aim and other objects which will become apparent hereinafter are achieved by a method for handling a call in an Intelligent telecommunications network, wherein the following steps are performed by a controller providing logic for the Intelligent telecommunications network:

receiving a first information element relating to a precedence indicator of a call prioritization service, sending a second information element derived from the first information element to a switch for the handling of the call according to a priority indicated by the second information element.

Preferably, the second information element is derived from the first information element by determining a priority according to the precedence indicator, analyzing if the determined priority is in accordance with at least one priority requirement determinable by the controller, and setting the priority indicated by the second information element according to a result of the analysis.

According to one embodiment of the invention, the first information element and the second information element can have the same data format with the priority indicated by the second information element being different from the priority according to the precedence indicator as a result of the step of setting.

In different embodiments of the invention, the second information element is derived from the first information element by copying the first information element to the second information element.

Advantageously, the first information element is received from the switch in a notification message and the second information element is sent to the switch in an instruction message instructing said switch to handle the call according to the priority indicated by the second information element.

The first information element can also be received from a home database by a response message responsive to an interrogation message sent from the controller to the home database.

Preferably, in the above step of determining, the priority is determined according to the precedence indicator of the first information element received from the switch, the priority requirement is determined as a priority according to the precedence indicator of the first information element received from the home database. In the above step of setting, the priority indicated by the second information element is set to the priority according to the priority requirement if the priority according to the priority requirement exceeds the priority indicated by the precedence indicator of the first information element received from the switch.

The call may be initiated by the controller, e.g. for a priority wake-up call, and the sending of the interrogation message is performed in response to such initiation. In this case the first information element is preferably received from the home database by the above response message.

Alternatively, the call may be indicated to be handled at the switch effecting the sending of the notification message to the controller, e.g. in mobile terminating or mobile originating or forwarding calls.

According to the preferred embodiments of the invention, the Intelligent telecommunication network comprises a Customised Application for Mobile Enhanced Logic CAMEL telecommunication network with the controller comprising a GSM Service Control Function gsmSCF. The call prioritization service is an enhanced Multi Level Precedence and Pre-emption service eMLPP and the precedence indicator is an eMLPP Level of Precedence. The first information element is preferably identical to the eMLPP Level of Precedence associated with the call handled by the switch (if applicable) or as stored at the home data base, and the second information element is preferably an eMLPP Level of Precedence derived from the first information element according to the invention, e.g. by copying or modifying.

Moreover, the controller is adapted to process at least one message, preferably all, of a group of messages comprising:

the interrogation message being an Any Time Subscription interrogation ATSI message adapted for requesting the precedence indicator, the response message being an ATSI response message adapted to comprise the first information element, the notification message being an Initial Detection Point CAP message adapted to comprise the first information element, and the instruction message being a CAMEL Application Part CAP message being selected from at least one Connect message CON or a Continue With Argument CWA message adapted to comprise the second information element.

The sending of the second information element may be effected according to the priority indicated by the second information element.

Moreover, the first information element may be received by at least one of the notification message and response message transmitted according to the priority associated with the precedence indicator. Namely, the first information element may be received on application level in the notification and/or response message and the sending side (home database or switch) to determine from the first information element value the priority on at least one lower protocol level (transport layer or TCAP).

The invention is furthermore embodied in devices like a controller and a switch and a system comprising said devices. The devices comprise sub-units like a receiver, a transmitter, or a processor. The sub-units can be separate entities or may be combined. An example for a combined sub-unit is a transceiver combining a transmitter and a receiver. A sub-unit may be build-up by further sub-units, e.g. a first sub-unit suited for wired communication and second sub-unit suited for wireless communication.

The controller providing logic for an Intelligent telecommunications network comprises a receiver for receiving messages, a transmitter for sending messages and a processor for processing messages and information, wherein the receiver is adapted to receive a first information element relating to a precedence indicator of a call prioritization service, the processor is adapted to derive a second information element from the first information element for instructing a switch to handle a call according to a priority indicated by the second information element, the transmitter is adapted to send the second information element to the switch.

Furthermore, the processor may be adapted to derive the second information element from the first information element by determining a priority according to the precedence indicator, analyzing if the determined priority is in accordance with at least one priority requirement determinable by the controller, and setting the priority indicated by the second information element according to a result of said analysis.

Furthermore, the processor may be adapted to process the first information element and the second information element to have the same data format with the priority indicated by the second information element being different from the priority according to the precedence indicator as a result of the step of setting.

Furthermore, the processor may be adapted to derive the second information element from the first information element by copying the first information element to the second information element.

Furthermore, the receiver may be adapted to receive the first information element from the switch in a notification message, the processor maybe adapted to generate an instruction message comprising the second information element, and the transmitter may be adapted to send the instruction message to said switch for instructing said switch to handle the call according to the priority indicated by the second information element.

Furthermore, the processor may be adapted to generate an interrogation message for requesting the first information element from a home data base, the transmitter may be adapted to sent the interrogation message to the home data base, and the receiver may be adapted to receive the first information element from a home database by a response message responsive to the interrogation message sent to the home database.

Furthermore, the processor may be adapted to modify a priority. In particular the processor may be adapted to, in said step of determining, to determine said priority according to the precedence indicator of the first information element received from said switch, to determine said priority requirement as a priority according to the precedence indicator of the first information element received from the home database, and, in said step of setting, to set the priority indicated by the second information element to the priority according to the priority requirement if the priority according to the priority requirement exceeds the priority indicated by the precedence indicator of the first information element received from the switch.

Furthermore, the processor may be adapted to initiate said call, wherein the processor may be adapted to initiate the sending of the interrogation message in response to said initiation, and the transmitter may be adapted to send the interrogation message to the switch.

Furthermore, the processor may be adapted to process at least one message of a group of messages comprising:
- the interrogation message being an Any Time Subscription interrogation ATSI message adapted for requesting the precedence indicator,
- the response message being an ATSI response message adapted to comprise the first information element,
- the notification message being an Initial Detection Point CAP message adapted to comprise the first information element, and
- the instruction message being a CAMEL Application Part CAP message being selected from at least one Connect message CON or a Continue With Argument CWA message adapted to comprise the second information element.

Furthermore, the processor may be adapted to initiate the sending of the second information element according to the priority indicated by the second information element.

The aim and objects of the invention are also achieved by a switch for handling a call in an Intelligent telecommunication network, the switch comprising a receiver for receiving messages, a transmitter for sending messages and a processor for processing messages and information, wherein the receiver is adapted to receive an instruction message from a controller providing logic for the Intelligent telecommunications network, the instruction message comprising a second information element derived from a first information element relating to a precedence indicator of a call prioritization service for instructing the switch to handle the call according to a priority indicated by the second information element, and the processor is adapted to initiate a handling of the call according to the priority indicated by the second information element.

This switch is suitable to interact with the controller according to the invention, so as to carry out the steps involved by the method according to the invention. For example, for a mobile terminating or mobile originating or forwarding call being indicated to be handled by the switch, the processor of the switch may be adapted to generate a notification message comprising a first information element with the first information element being derived from a precedence indicator associated with the mobile terminating or mobile originating or forwarding call indicated to be handled by the switch. The transmitter of the switch may be adapted to send a notification message comprising the first information element to the controller. Preferably, the processor of the switch may be further adapted to determine a priority from the precedence indicator and to initiate a transmission of the notification message according to said determined priority.

The present invention also concerns computer programs comprising portions of software codes in order to implement the method as described above when operated at a processor of a controller or a switch. Such a computer program can be stored on a computer readable medium. The computer-readable medium can be a permanent or rewritable memory within the controller or the switch or can be located externally. The respective computer program can be also transferred to the controller or the switch for example via a cable or a wireless link as a sequence of signals.

According to a particular aspect of the invention, a computer program is provided, which is loadable into a processor of a controller providing logic for an Intelligent telecommunications network, wherein the computer program comprises code adapted to obtain a first information element relating to a precedence indicator of a call prioritization service, to derive a second information element from the first information element for instructing a switch to handle a call according to a priority indicated by the second information element, and to initiate a sending of the second information element to the switch.

A computer program according to a further aspect of the invention is also provided, which program is loadable into a processor of a switch for handling a call in an Intelligent telecommunication network, wherein the computer program comprises code adapted to process a received instruction message from a controller providing logic for the Intelligent telecommunications network, the instruction message comprising a second information element derived from a first information element relating to a precedence indicator of a call prioritization service for instructing the switch to handle the call according to a priority indicated by the second information element, and the program further comprising code adapted to initiate a handling of the call according to the priority indicated by the second information element.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION OF THE PREFERRED EMBODIMENTS

Figure 1:
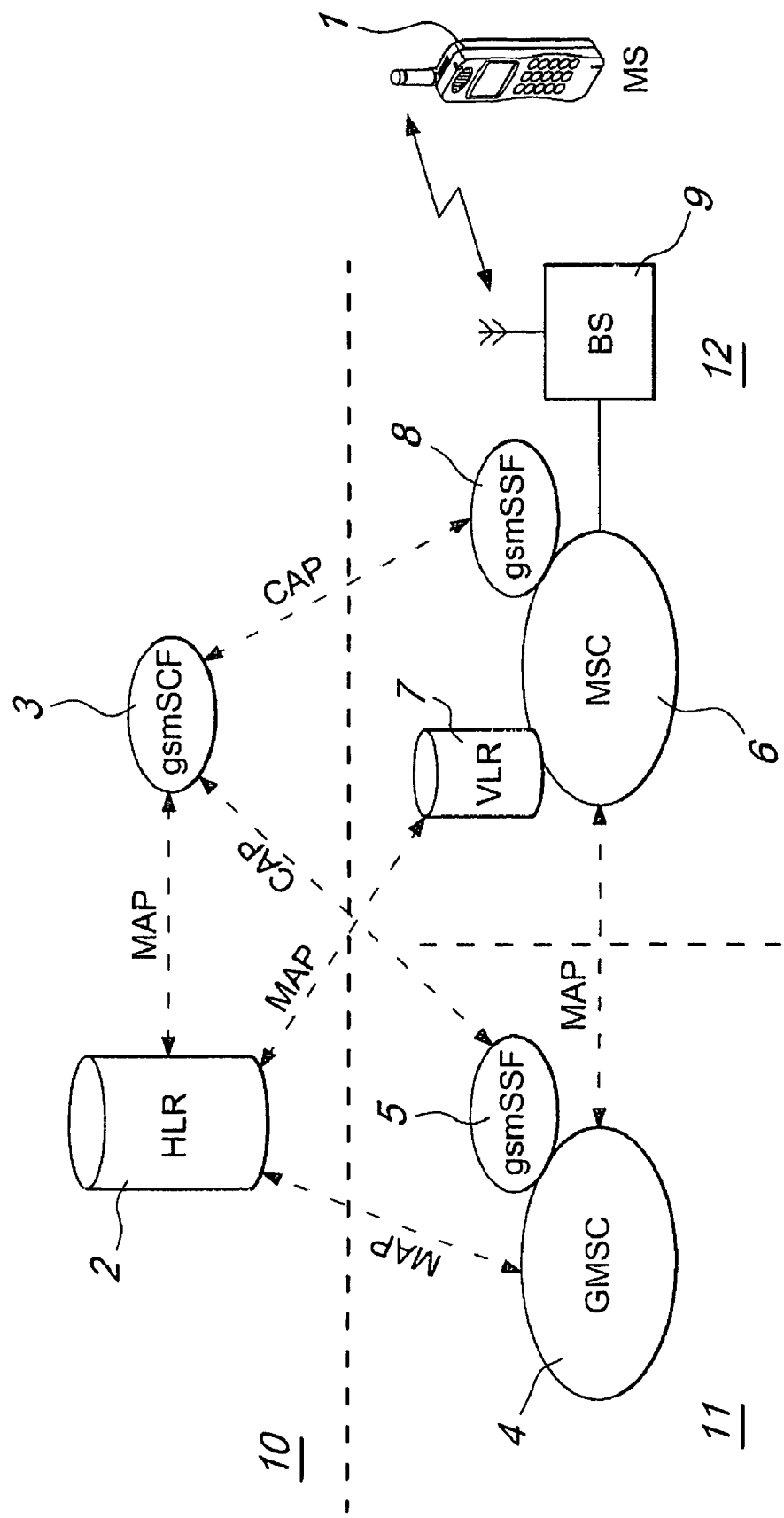
FIG. 1 is a schematic view of the architecture of a CAMEL network.

While the following description refers to CAMEL networks, it is straightforward to understand that the present invention can be applied to any Intelligent telecommunication network without departing from the scope of the invention. As it is known, an Intelligent Network (IN) is a network architecture connected to either a fixed or a mobile communication network and in which services are controlled by a separate functional unit, hereinafter called a controller or Service Control Function node or Service Control Point (SCP).

The SCP provides logic for the Intelligent telecommunication network and interfaces to the fixed or the mobile communication network. In particular, the SCP interfaces to a serving node of the network by means of a switch adapted to handle calls in an IN, hereinafter called Service Switching Function node or Service Switching Point (SSP).

With reference to the figures, the architecture of a CAMEL network in which the invention is preferably implemented mainly comprises a Home Public Land Mobile Network HPLMN 10, an interrogating network 11 and a visited network VPLMN 12.

The home network comprises a home database HLR 2, which particularly stores information about the subscription, the subscriber's identification data and profile, the services that the subscriber is entitled to and the subscriber's location. In addition, the HLR 2 stores the CAMEL information relevant to the current subscription (Camel Subscription Information or CSI), such as Originating CSI (O-CSI), Dialled Services CSI (D-CSI), Terminating CSI (T-CSI) and VMSC Terminating CSI (VT-CSI), which information is sent to the visited or the interrogating network in response to location updates or to requests for routing information.

The home network also comprises a controller (Service Control Point) such as a GSM Service Control Function (gsmSCF), which is a functional entity containing the CAMEL service logic to implement operator specific services. Although the gsmSCF is hereinafter considered as being part of the home network, it is clear that the gsmSCF and the HPLMN can be distinct entities as well, as some countries may require that the gsmSCF and the HPLMN are controlled by different operators.

The visited network 12 is composed of a number of service areas which are associated to Mobile service Switching Centres (MSCs) such as MSC 6 and Visitor Location Registers (VLRs) such as VLR 7. MSC 6 switches speech and data connections between a Base Station 9, other MSCs, other networks and external non-mobile networks.

VLR 7 stores data about all the users that are roaming within the service area of MSC 6. In particular, the O-CSI, D-CSI and VT-CSI are stored in VLR 7 as a part of the subscriber data for subscribers roaming in the VLR area.

The MSC 6 also handles a number of functions associated with mobile subscribers, such as registration, location updating and handover between a mobile station 1 and the network. Moreover, MSC 6 supports CAMEL and is able to receive an O-CSI, D-CSI or VT-CSI from VLR 7 indicating the MSC to request instructions from a Service Switching Point such as a GSM Service Switching Function (gsmSSF) 8, which interfaces MSC 6 to gsmSCF 3.

The interrogating network 11 comprises a Gateway Mobile service Switching Centre GMSC 4, which switches calls to or from other mobile or public telephone networks and which comprises its own gsmSSF 5 for interfacing with gsmSCF 3.

The serving nodes MSC 6 and GMSC 4 and the location registers communicate one with another using Mobile Application Part (MAP) messages and the gsmSCF 3 and gsmSSF 5 and 8 communicate using CAMEL Application Part (CAP) messages.

According to the preferred embodiments of the invention, the CAP operations comprise a new information element (IE) reserved for the Precedence Indicator of a call prioritization service, in particular for eMLPP parameters. This information element is used to notify the gsmSCF about the level of precedence or other eMLPP parameters already assigned to a certain call or is used by the gsmSCF to modify the condition of eMLPP service in the core network depending on specific end-user service logic.

The new information element has preferably the bit distribution set forth in Table 1. The precedence level is coded in the first four bits of the first octet, so as to comprise decimal values from 1 to 5, which correspond to eMLPP priority levels from 4 to 0, respectively.

Bits 5 and 6 are reserved for the Look ahead For Busy (LFB) feature, through which a mobile station can look ahead in the mobile network to determine if a call it is about to place has available resources for call completion with a given priority. Decimal values from 0 to 2 are set for coding "LFB allowed", "Path reserved" and "LFB not allowed".

TABLE 1

| Octet | 7 | 6 | 5 | 4 | 3 | 2 | 1 | 0 |
|---|---|---|---|---|---|---|---|---|
| 1 | spare | LFB | | spare | Precedence level | | | |
| 2 | NI digit 1 | | | | NI digit 2 | | | |
| 3 | NI digit 3 | | | | NI digit 4 | | | |
| 4 | MLPP service domain - octet 1 | | | | | | | |
| 5 | MLPP service domain - octet 2 | | | | | | | |
| 6 | MLPP service domain - octet 3 | | | | | | | |

Octets 2 and 3 contain Network Identity (NI) information in which each digit is coded in binary coded decimal representation from 0 to 9. The first digit of this field is coded 0 and the Telephony Country Code (TCC) follows in the second to fourth NI digits. The most significant TCC digit is in the second NI digit, while the least significant digit is the fourth NI digit.

Finally, the fourth to sixth octet contain a 24-bit pure binary code allocated to an MLPP service domain, in which bit 7 of octet 4 is the most significant bit and bit 0 of octet 6 is the least significant bit.

A first information element relating to a precedence indicator can be received by the gsmSCF 3 through a notification message from an IN switch such as the gsmSSF 5,8 and/or through a response message from a home database such as HLR 2 in response to an interrogation message sent to the HLR, as it will explained hereinafter.

In all cases, the gsmSCF 3 is adapted to send to the gsmSSF 5,8 an instruction message comprising a second information element derived from the first information element for instructing the gsmSSF to handle the call according to a priority indicated by the second information element. Preferably, the sending and transmission of the instruction message to the gsmSSF 5,8 occurs at the priority according to the second information element.

The first information element and the second information element may be identical or different. In particular, the first information element and the second information element may have the same data format but indicate different priority or vice versa or may have the same data format and may indicate the same priority. For the latter example, the gsmSCF 3 may be adapted to copy the first information element to the second information element. The gsmSCF 3 may analyze if the received first information element is in accordance with at least one priority requirement like an internal priority setting of the gsmSCF 3, a priority setting associated to a service or other network-related priority settings or indications, or a first information element received from the HLR 2 in addition to a first information element received from the gsmSSF 5,8, and to set the priority indicated by the second information element according to a result of the analysis.

The first and second information elements that can be communicated accordingly between the gsmSSF 5 or 8 and the gsmSCF 3 are preferably included in CAP operations, such as Initial Detection Point (IDP), Connect (CON) or Continue With Argument (CWA). Accordingly, the gsmSCF 3 is able to use the new information to prioritise the related IN service over other IN services. The information may be modified or set by gsmSCF and returned to the Core Network via a CAP operation, as well as derived for being used in any requested TCAP (Transaction Capabilities Application Part) service.

The first information element that can be communicated from the HLR 2 to the gsmSCF 3 is preferably included in a MAP operation.

Given the knowledge of the eMLPP level of precedence in the gsmSSF and/or the gsmSCF, the priority indicated to TCAP on a per-message transfer basis by TC-users that invoke TCAP to transport application messages can be derived from such level of precedence or precedence indicator. Therefore, the priority level indicated by the TC-user to the TCAP can be dynamically adapted to any changes of the eMLPP level of precedence.

In other words, from the precedence indicator relating to a first communication protocol can be derived a priority relating to a second communication protocol (e.g. TCAP or SCCP). For instance, the TCAP priority can be derived from the knowledge of eMLPP level of precedence.

Figure 2:
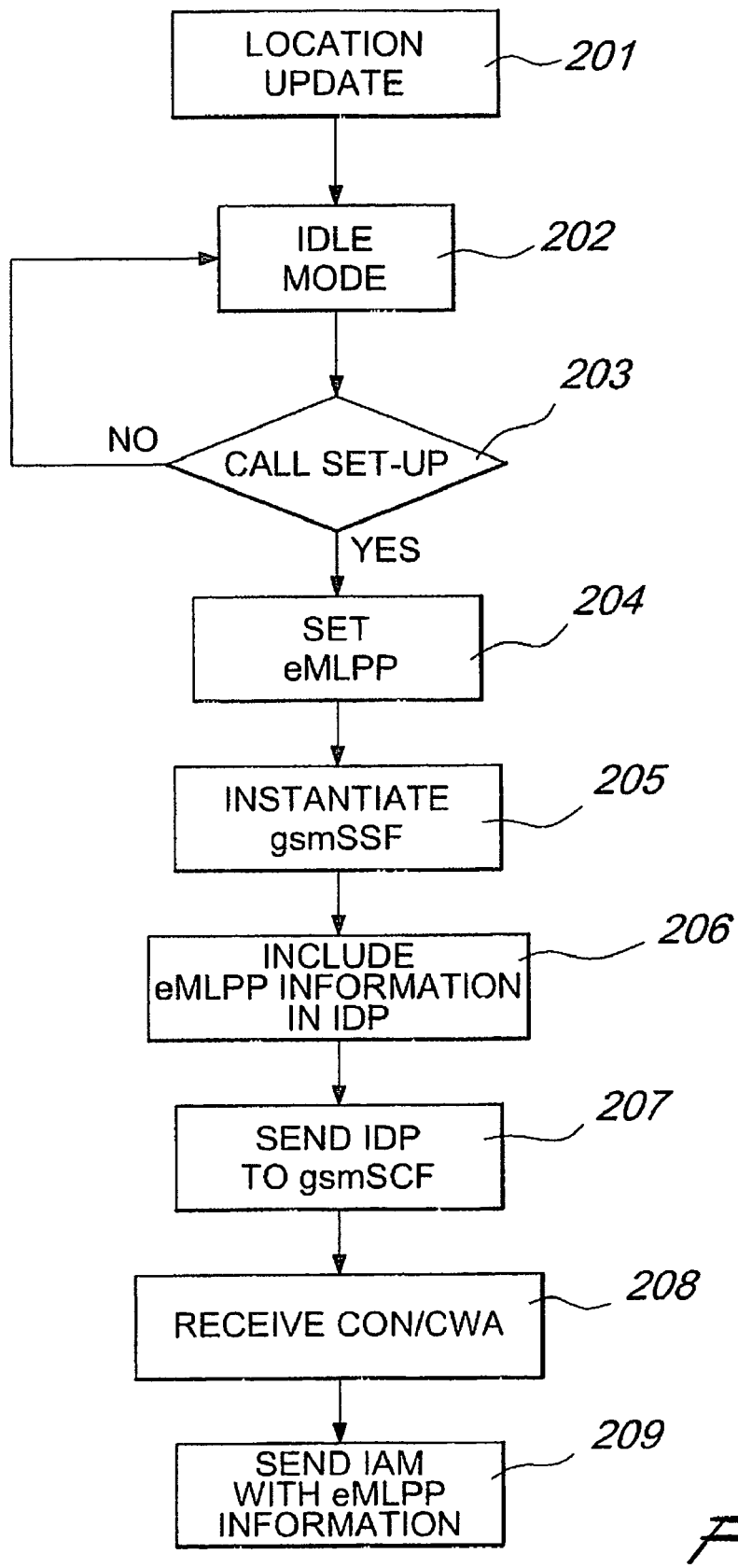
FIG. 2 is a block diagram of the method according to a first embodiment of the invention.

With reference to FIG. 2, the invention is applied to a mobile-originated call. As a mobile station (MS) 1 having an eMLPP and a CAMEL subscription enters VPLMN 12, a Location Update procedure is performed (step 201). The HLR 2 provides the MSC/VLR 6 with eMLPP information and CAMEL Subscription Information (CSI).

Then, MS 1 enters in idle mode (step 202). As soon as MS 1 initiates a call (step 203), the eMLPP level of precedence and other relevant parameters are set in the MSC 6 for the requested call (step 204).

Due to CAMEL subscription, the MSC 6 instantiates an internal gsmSSF entity 8 (step 205). Then, the gsmSSF 8 includes the eMLPP level of precedence and any additional eMLPP information in the new Information Field of a notification message such as an IDP message as defined above (step 206) and finally sends the IDP message to the gsmSCF 3.

The eMLPP information is then included by the gsmSCF 3 in form of the second information element in an instruction message such as a CWA or CON message that is sent to the gsmSSF 8.

Upon receiving the CON/CWA message (step 208) the gsmSSF 8 and the MSC 6 can continue the call processing with modified information (as received from the gsmSCF 3) at the DP at which it previously suspended call processing to await gsmSCF instructions.

In particular, in step 209 the MSC 6 sends an ISDN User Part (ISUP) Initial Address Message (IAM) to the destination with the eMLPP settings as received from the gsmSCF 3.

According to the eMLPP information received via the IDP, the gsmSCF 3 can prioritise its internal processes and the dialogue between the gsmSSF and the gsmSCF can be treated according to the eMLPP level of precedence. When the gsmSSF or the gsmSCF initiate an IN service, they can use the eMLPP level to derive the priority indication to be provided to the TCAP service.

Moreover, the gsmSCF can decide how the cMLPP level of precedence and any other eMLPP information have to be modified for the continuation of the call when call control is returned to the gsmSSF.

In a second illustrative embodiment of the invention, the gsmSCF assigns the eMLPP level of precedence and any other eMLPP relevant information to a mobile-terminated call. The destination mobile station has an eMLPP subscription.

Figure 3:
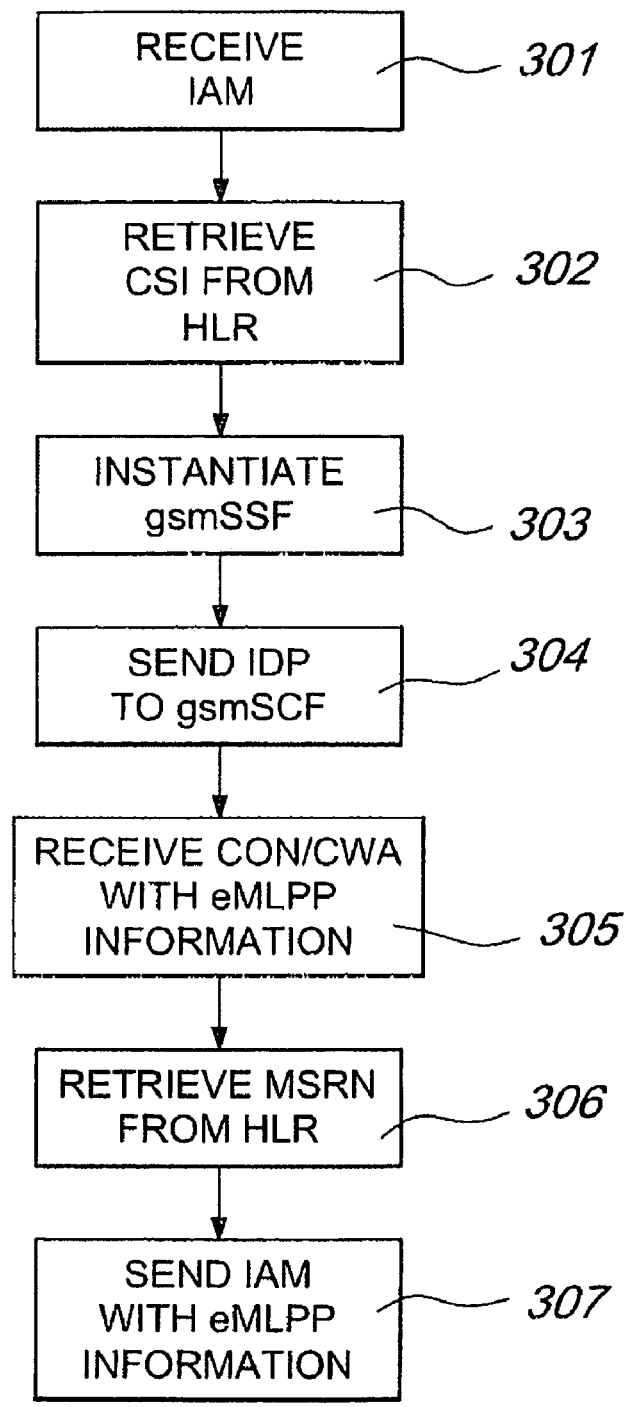
FIG. 3 is a block diagram of the method according to a second embodiment of the invention.
Figure 4:
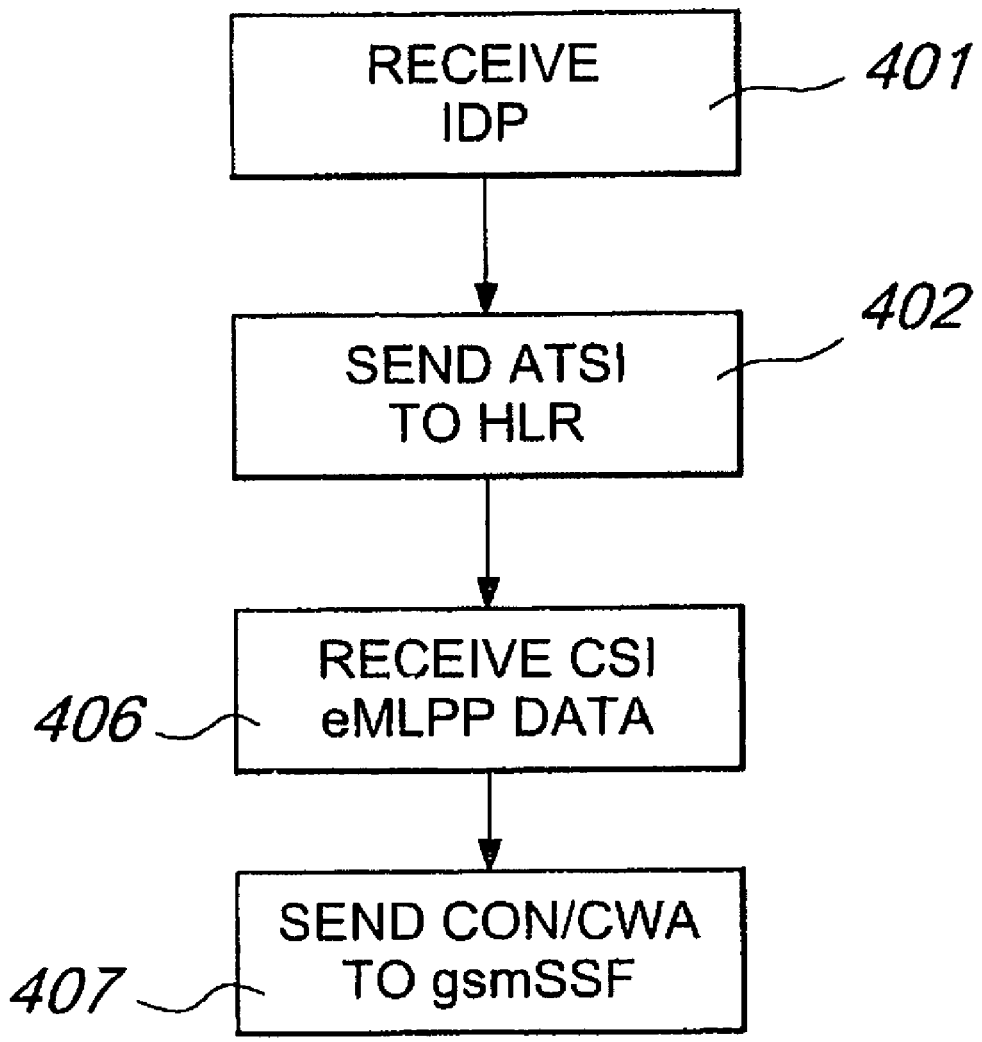
FIG. 4 is a block diagram of the method for retrieving eMLPP information at the gsmSCF.

Referring to FIGS. 3 and 4, a call is received at the GMSC 4 by means of an ISUP IAM and, as an assumption for this particular example, no eMLPP information is included in the incoming signalling (step 301).

The GMSC 4 performs a first HLR interrogation and receives the CSI from the HLR 2 (step 302).

Due to CAMEL subscription, the GMSC 4 instantiates an internal gsmSSF entity 5 (step 303) which sends an IDP to the gsmSCF 3 (step 304). In this phase, no information about eMLPP is notified to the gsmSCF, since such information is not received from the interworking network. If such information were received in step 301, the IDP would contain it as described above.

After having received the IDP (step 401) the gsmSCF 3 sends an Any Time Subscription Interrogation (ATSI) message in order to get eMLPP subscription information from the HLR 2 (step 402).

Then, the gsmSCF 3 receives the eMLPP data from the HLR (step 406) through a response message and sends information about the eMLPP level of preference to the gsmSSF via a CON or CWA message according to the invention (step 407).

It is to be noted that not exactly the same eMLPP information retrieved from the HLR is necessarily sent to the gsmSSF. For instance, the gsmSCF may use the information to check the lowest precedence level that the gsmSCF can assign when modifying or setting the level of precedence before sending it to the gsmSSF.

It may be further noted, if cMLPP information would have been received at step 301 and would have been sent from the gsmSSF to the gsmSCF at step 304, the gsmSCF could copy this received eMLPP information into the instruction message leaving out or ignoring step 306. Alternatively, the gsmSCF could further request eMLPP information via step 306 and use this eMLPP information received from the HLR as priority requirement to be compared to the eMLPP information received from gsmSSF and to set the eMLPP information of the instruction message according to the priority requirement.

After reception of the IAM message of step 307, at this point, the GMSC 4 handles the call according to the eMLPP information received from the gsmSCF 3, in particular according to the level of precedence which is now set for the call.

The GMSC 4 performs a second HLR interrogation and receives a Mobile Station Roaming Number (MSRN), in order to address the call to the relevant MSCNLR.

Finally, the GMSC 4 sends an ISUP IAM to the destination with eMLPP settings as received from the gsmSCF.

It is seen that not only the eMLPP Level of Precedence can be used to prioritise the gsmSCF internal processes, but the gsmSCF can also set a Precedence Level and other eMLPP parameters when a call to a mobile subscriber comes from a network that does not support the eMLPP service. This is a capability that may be used by service operators to prioritise the calls directed to a given called subscriber. In fact, the subscription options can be retrieved from the HLR via a MAP message such as an ATSI request.

Of course, while the above process refers to mobile-terminated calls in GMSC when the gsmSCF is invoked via a T-CSI, it is straightforward for the skilled in the art that a similar process may apply to mobile-terminated calls in the MSCNLR when the gsmSCF is invoked via VT-CSI, as well as to mobile forwarding calls in MSCNLR and GMSC when gsmSCF is invoked, one or more times, due to subscriptions such as O-CSI, D-CSI or N-CSI.

The invention can be also applied to gsmSCF-initiated calls. In a third preferred embodiment of the invention, when the gsmSCF wishes to originate a new call, the gsmSCF sends an ATSI message to the HLR in order to get the eMLPP subscription information. Then, the gsmSCF starts a new call according to the CAMEL standards, by sending the sequence of operations ICA (Initiate Call Attempt, for creating a new leg), RRB (Request Report Basic Call State Model, for arming of call events reporting) and CWA. The CWA message includes the eMLPP level of precedence and other eMLPP information as received from the HLR.

Accordingly, the GMSC or the MSCNLR can set up the eMLPP information according to the parameters received from the gsmSCF. In particular, the GMSC or the MSC/VLR constructs an ISUP Initial Address Message using the eMLPP parameters and sends it to the destination exchange.

It has thus been shown that the present invention fulfils the proposed aim and objects. In particular, the gsmSCF where the scripts are run can be informed about the level of precedence defined for a certain call in the core network and can even assign or modify the level of precedence and other relevant eMLPP information to the call.

The method according to the invention allows to prioritise the processes by the gsmSCF and derive the precedence on the dialogue between the gsmSSF and the gsmSCF, even in those cases where the eMLPP information is not modified by the gsmSCF.

In case of mobile-terminated calls in GMSC, operators can use the eMLPP information to prioritise the calls for a given called subscriber, even when the interworking network does not completely support eMLPP services.

Similarly, in mobile-forwarding calls in the MSCNLR or the GMSC, operators can use the newly added information to prioritise the new call leg that is going to be established.

In gsmSCF-initiated new calls or gsmSCF-initiated new party calls, operators can prioritise the calls taking into account the application that is going to be served.

It can be also appreciated that services modelled over eMLPP infrastructures such as the US Government's feature Wireless Priority Service (WPS) may benefit of the present invention, thus giving the possibility to interface the WPS with gsmSCF.

The skilled in the art easily understands that the above described steps may be performed by any hardware and/or software and telecommunications means programmed through conventional techniques in order to take into account the additional information and operational data needed by the present invention. The invention is therefore preferably implemented by introducing new functionality in existing systems, through conventional techniques which are clearly in the reach of the average technician and, therefore, are not hereby discussed in detail.

Clearly, several modifications will be apparent to and can be readily made by the skilled in the art without departing from the scope of the present invention. Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

The invention claimed is:

1. A method for handling a call in an Intelligent telecommunications network, the method comprising the steps of:
    receiving a first information element comprising a level of precedence of a call prioritization service,
    determining a priority according to the level of precedence of the first information element,
    analyzing if the determined priority is in accordance with at least one priority requirement determinable by a controller, said priority requirement being determined as a priority according to the level of precedence of the first information element received from the home database;
    setting the priority indicated by the second information element according to a result of said analysis; and
    sending a second information element, dynamically derived from the first information element, to a switch for handling the call according to a priority derived from the level of precedence comprised in the first information element and indicated by the second information element.

2. The method according to claim 1, wherein the first information element and the second information element have the same data format with the priority indicated by the second information element being different from the priority according to the level of precedence as a result of the setting step.

3. The method according to claim 1, wherein the second information element is derived from the first information element by copying the first information element to the second information element.

4. The method according to claim 1, wherein the first information element is received from the switch in a notification message and the second information element is sent to the switch in an instruction message instructing said switch to handle the call according to the priority indicated by the second information element.

5. The method according to claim 1, wherein the first information element is received from a home database by a response message responsive to an interrogation message sent from a controller to the home database.

6. The method according to claim 1, wherein
    in said step of determining, said priority is determined according to the level of precedence of the first information element received from said switch, and
    in said step of setting, the priority indicated by the second information element is set to the priority according to the priority requirement if the priority according to the priority requirement exceeds the priority indicated by the level of precedence of the first information element received from the switch.

7. The method according to claim 1, wherein said call is initiated by a controller and the sending of the interrogation message being performed in response to said initiation.

8. The method according to claim 5, wherein said call is indicated to be handled at the switch effecting the sending of the notification message to the controller.

9. The method according claim 1, wherein said Intelligent telecommunication network comprises a Customised Application for Mobile Enhanced Logic CAMEL telecommunication network with a controller comprising a GSM Service Control Function gsmSCF.

10. The method according to claim 1, wherein the call prioritization service is an enhanced Multi Level Precedence and Pre-emption service eMLPP and the level of precedence is an eMLPP Level of Precedence.

11. The method according to claim 9, wherein the controller is adapted to process at least one message of a group of messages comprising:
the interrogation message being an Any Time Subscription interrogation ATSI message adapted for requesting the level of precedence,
the response message being an ATSI response message adapted to comprise the first information element, the notification message being an Initial Detection Point CAP message adapted to comprise the first information element, and
the instruction message being a CAMEL Application Part CAP message being selected from at least one Connect message or a Continue With Argument message adapted to comprise the second information element.

12. The method according to claim 1, wherein the sending of the second information element is effected according to the priority indicated by the second information element.

13. The method according to claim 1, wherein the first information element is received by at least one of the notification message and response message transmitted according to the priority associated with the level of precedence.

14. A controller providing logic for an Intelligent telecommunications network, the controller comprising:
a receiver for receiving messages,
a transmitter for sending messages and
a processor for processing messages and information, wherein
the receiver is adapted to receive a first information element comprising a level of precedence of a call prioritization service,
the processor is adapted to dynamically derive a second information element from the first information element for instructing a switch to handle a call according to a priority derived by the controller from the level of precedence comprised in the first information element and indicated by the second information element,
the transmitter is adapted to send the second information element to the switch.

15. A switch for handling a call in an Intelligent telecommunication network, the switch comprising:
a receiver for receiving an instruction message from a controller providing logic for the Intelligent telecommunications network, the instruction message comprising a second information element dynamically derived from a first information element comprising a level of precedence of a call prioritization service for instructing the switch to handle the call according to a priority derived from the level of precedence comprised in the first information element and indicated by the second information element;
a transmitter for sending messages; and
a processor for processing messages and information, wherein the processor is adapted to initiate a handling of the call according to the priority indicated by the second information element.

16. A telecommunication system comprising a controller, the controller comprising:
a receiver for receiving messages,
a transmitter for sending messages and
a processor for processing messages and information,
the receiver being adapted to receive a first information element comprising a level of precedence of a call prioritization service,
the processor being adapted to dynamically derive a second information element from the first information element for instructing a switch to handle a call according to a priority derived by the controller from the level of precedence comprised in the first information element and indicated by the second information element, and
the transmitter being adapted to send the second information element to the switch;
the controller being connected to a switch and to a home database, the switch comprising:
a receiver for receiving messages,
a transmitter for sending messages and
a processor for processing messages and information, wherein the receiver is adapted to receive an instruction message from the controller providing logic for the Intelligent telecommunications network, the instruction message comprising a second information element derived from a first information element comprising the level of precedence of the call prioritization service for instructing the switch to handle the call according to a priority derived from the level of precedence comprised in the first information element and indicated by the second information element, and
the processor being adapted to initiate a handling of the call according to the priority indicated by the second information element.

17. The controller according to claim 14, the processor deriving the second information element by:
determining a priority according to the level of precedence,
analyzing if the determined priority is in accordance with at least one priority requirement determinable by the controller,
setting the priority indicated by the second information element according to a result of said analysis, wherein the first information element and the second information element have the same data format with the priority indicated by the second information element being different from the priority according to the level of precedence.

18. The controller according to claim 17, wherein the second information element is derived from the first information element by copying the first information element to the second information element.

19. The controller according to claim 17, wherein the first information element is received from the switch in a notification message and the second information element is sent to the switch in an instruction message instructing said switch to handle the call according to the priority indicated by the second information element.

20. The switch according to claim 15, wherein the second information element is derived from the first information element by
determining a priority according to the level of precedence, analyzing if the determined priority is in accordance with at least one priority requirement determinable by a controller, and setting the priority indicated by the second information element, wherein the first information element and the second information element have the same data format with the priority indicated by the second information element being different from the priority according to the level of precedence.

21. The switch according to claim 15, wherein the first information element and the second information element have the same data format with the priority indicated by the second information element being different from the priority according to the level of precedence.

22. The switch according to claim 15, wherein the second information element is derived from the first information element by copying the first information element to the second information element.

23. The switch according to claim 15, wherein the first information element is sent from to the controller in a notification message and the second information element is received by the switch in an instruction message instructing said switch to handle the call according to the priority indicated by the second information element.

* * * * *